United States Patent
Kalweit et al.

(12) 
(10) Patent No.: US 6,319,290 B1
(45) Date of Patent: Nov. 20, 2001

(54) FIBER-REACTIVE DISAZO DYESTUFFS

(75) Inventors: Detlef Kalweit, Lörrach (DE); Martin Oberholzer, Therwil (CH)

(73) Assignee: Clariant Finance (BVI) Limited, Tortola (VG)

( * ) Notice: Subject to any disclaimer, the term of this patent is extended or adjusted under 35 U.S.C. 154(b) by 0 days.

(21) Appl. No.: 09/457,977

(22) Filed: Dec. 9, 1999

(30) Foreign Application Priority Data

Dec. 11, 1998 (CH) .................................................. 2468/98

(51) Int. Cl.⁷ ......................... C09B 62/08; C09B 67/26; D06P 1/382; D06P 3/66
(52) U.S. Cl. .......................... 8/549; 8/641; 8/917; 8/918; 534/632; 534/634; 534/637; 534/638; 106/31.48; 106/31.52
(58) Field of Search ................................ 8/641, 549, 918, 8/917; 534/632, 634, 637, 638; 106/31.48, 31.52

(56) References Cited

U.S. PATENT DOCUMENTS

| | | |
|---|---|---|
| 3,647,778 | 3/1972 | Andrew et al. . |
| 5,245,020 | 9/1993 | Jessen et al. . |
| 5,931,975 | 8/1999 | Müller et al. . |
| 5,989,297 | 11/1999 | Reichert et al. . |

FOREIGN PATENT DOCUMENTS

| | | |
|---|---|---|
| 2 000 518 | 7/1970 | (DE) . |
| 2 001 960 | 7/1970 | (DE) . |
| 80 792 | 3/1971 | (DE) . |
| 196 07 851 | 9/1997 | (DE) . |
| 0 042 204 | 12/1981 | (EP) . |
| 0 256 650 | 2/1988 | (EP) . |
| 0 391 264 | 10/1990 | (EP) . |
| 0 748 850 | 12/1996 | (EP) . |
| 0 755 985 | 1/1997 | (EP) . |
| 2 228 822 | 12/1974 | (FR) . |
| 1 260 582 | 1/1972 | (GB) . |

OTHER PUBLICATIONS

Derwent Patent Family Abstract for DD 80 792.
Derwent Patent Family Abstract for FR 2 228 822.
Derwent Patent Family Abstract for DE 196 07 851.

*Primary Examiner*—Margaret Einsmann
(74) *Attorney, Agent, or Firm*—Krishna Banerjee

(57) ABSTRACT

Compounds of the general formula (I)

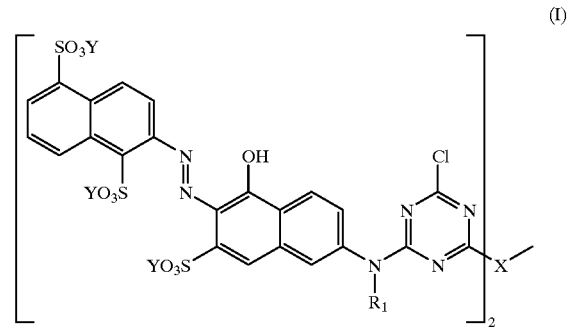

wherein $R_1$ represents hydrogen or a $C_1$–$C_4$-alkyl group, X represents the radical of aliphatic, cyclic or aromatic diamines and Y represents hydrogen or an alkali metal, and a process for their preparation and their use for dyeing organic substrates, and organic substrates dyed with these compounds.

16 Claims, No Drawings

FIBER-REACTIVE DISAZO DYESTUFFS

BACKGROUND OF THE INVENTION

This invention relates to new bridged fiber-reactive disazo dyestuffs.

Reactive dyestuffs are an important group of dyestuffs. They can be defined generally as water-soluble dyestuffs which have a grouping which is capable of covalent linking with the fiber. They are used for dyeing substrates which have in their structure chemical groups with which a chemical reaction can be entered into.

Fibers which are suitable for dyeing with reactive dyestuffs are organic substrates, in particular cellulose, polyamides and animal fibers.

SUMMARY OF THE INVENTION

Compounds of the general formula (I)

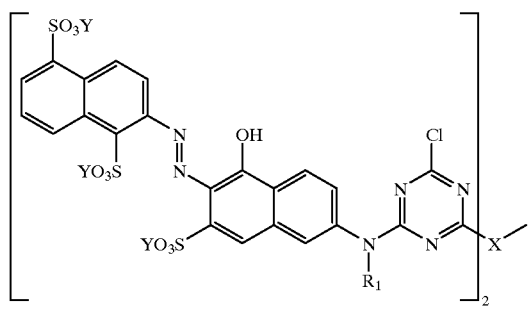

wherein $R_1$ represents hydrogen or a $C_1$–$C_4$-alkyl group, X represents the radical of aliphatic, cyclic or aromatic diamines and Y represents hydrogen or an alkali metal, and a process for their preparation and their use for dyeing organic substrates, and organic substrates dyed with these compounds.

DESCRIPTION OF THE PREFERRED EMBODIMENTS

The new bridged reactive dyestuffs which have now been found are distinguished by the following chemical structure (formula (I))

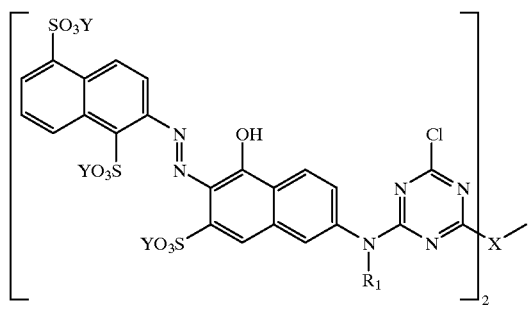

wherein $R_1$ represents hydrogen or a $C_1$–$C_4$-alkyl chain. Preferably, $R_1$ represents hydrogen or a methyl group.

The bridge member X represents the radical of aliphatic or aromatic diamines, and also the radical of cyclic diamine compounds, which can be either unsubstituted or substituted, the two amino groups of aromatic diamines preferably being linked in the meta- and para-positions.

Y represents hydrogen or alkali metals, such as Li, Na or K; that is to say the invention also relates to salts and mixtures of such compounds.

Compounds with the following structure (formula (Ia)) are preferred:

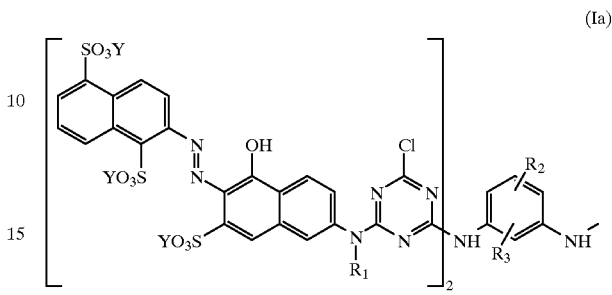

where $R_1$ represents hydrogen or a methyl group.

$R_2$ and $R_3$ independently of one another represent hydrogen, $C_{1-4}$ alkyl, —$SO_3R_4$, —$COOR_5$, —$OR_6$, wherein $R_4$–$R_6$ independently of one another represent hydrogen, alkali metals or aliphatic groups.

Preferably, $R_2$ and $R_3$ independently of one another are hydrogen, —$CH_3$, —OH, —$SO_3H$, —$OCH_3$, —COOH.

Y represents hydrogen or alkali metals, such as Li, Na or K.

Compounds of the formula (Ib) are particularly preferred:

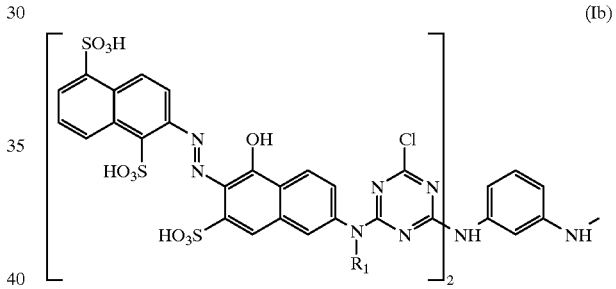

wherein $R_1$ represents hydrogen or a methyl group.

The synthesis of the new compounds is also claimed.

Two mole of the compound of the formula (II)

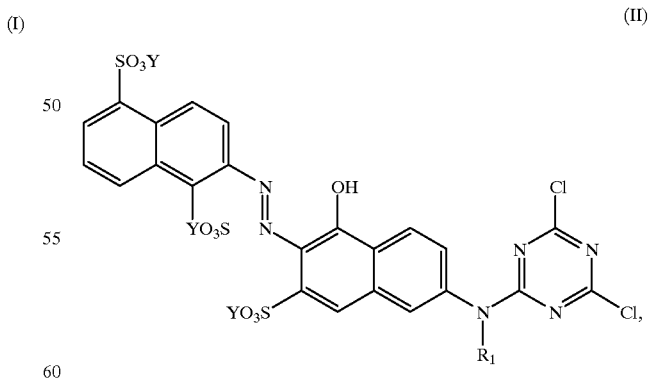

wherein $R_1$ and Y have the abovementioned meanings, are subjected to a condensation reaction with one mole of an aliphatic or aromatic diamine, or of a cyclic diamine compound, which in their turn can be substituted.

The compound with the formula (II) is synthesized by generally known methods.

The compounds thus obtained are salted out by customary methods and filtered off or isolated by means of spray drying and then dried. Dyestuffs which dye cellulose, polyamides and animal fibers, depending on the substituents, in the most diverse brilliant orange shades are thus obtained.

The compounds of the formula (I) and mixtures thereof are reactive dyestuffs; they are suitable for dyeing or printing organic substrates containing hydroxyl groups or nitrogen.

According to another aspect of the invention, a process for dyeing or printing organic substrates containing hydroxyl groups or nitrogen, wherein dyeing or printing is carried out with the compounds defined above or salts or mixtures thereof, is accordingly provided.

It should be noted that any reference to compounds or salts in the plural in this text is also to be interpreted as a reference to a compound or a salt in the singular.

Preferred substrates which may be mentioned are leather and fiber materials which consist of naturally occurring or synthetic polyamides, and in particular naturally occurring or regenerated cellulose, such as cotton, viscose or viscose staple, or comprise these. The most preferred substrate is textile material, which consists of cotton or comprises this.

According to another aspect of the present invention, the use of the compounds defined above and salts or mixtures thereof for dyeing or printing the substrates described above is provided.

The compounds of the formula (I) can be employed in dye liquors or in printing pastes by all the dyeing or printing processes customary for reactive dyestuffs. Preferably, dyeing is carried out by the exhaust process in the temperature range of 50–100° C.

The compounds according to the invention can be used as an individual dyestuff and, because they can readily be combined, also as a combination element with other reactive dyestuffs of the same class which have comparable dyeing properties, such as, for example, their general fastness properties, their exhaustion and fixing value and the like. The resulting combination dyeings show just as good fastness properties as the dyeings with the individual dyestuff.

Good exhaustion and fixing values are obtained with the compounds of the formula (I). The non-fixed dyestuff content can easily be washed out. The resulting dyeings and prints show a good fastness to light. In addition, they have good wet-fastness properties, for example in respect of fastness to washing, water, seawater and perspiration, and have a good resistance to oxidative influences, such as to chlorine-containing water, hypochlorite bleach, peroxide bleach and to perborate-containing detergents.

According to another aspect of the present invention, an organic substrate containing hydroxyl groups or nitrogen which has been dyed or printed by the dyeing or printing process described above is provided.

Substrates, in particular cellulose, polyamides and animal fibres, preferably cotton, which have been dyed with such compounds are also claimed.

The new dyestuffs can also be used in the preparation of printing inks which are suitable for the ink jet process.

The following examples are intended to illustrate the invention.

In these Examples all parts and all the percentages are by weight and the temperatures given are in degrees Celsius, unless indicated to the contrary.

EXAMPLES

Example 1

119.5 parts of 2-amino-5-hydroxynaphthalene-7-sulfonic acid are suspended in 1200 parts of water at 35° C. to 40° C. and are dissolved at a pH of 6.5 to 7.0 by addition of sodium hydroxide solution. This solution is added dropwise to a suspension which has been prepared beforehand from 500 parts of an ice/water mixture and 100 parts of 2,4,6-trichloro-1,3,5-triazine in the presence of a wetting agent. 145.5 parts of 2-amino-naphthalene-1,5-disulfonic acid are then diazotized by known methods, and this diazonium salt is allowed to react with the previously prepared coupling component at a pH of 6.0 to 7.0 at 50° C. to 60° C. and with 26 parts of 1,3-diaminobenzene, which have been dissolved beforehand in 50 parts of water. When the reaction has ended, the resulting compound is salted out by customary methods and filtered off or isolated by means of spray drying and then dried.

Example 2–22

Analogously to the synthesis described in Example 1, further compounds of the following structure can be synthesized:

| Example No. | $R_1$ | Bridge X |
|---|---|---|
| 2 | —$CH_3$ | —HN—(1,3-phenylene)—NH— |
| 3 | —$CH_3$ | —HN—(phenylene with $SO_3H$)—NH— |
| 4 | —H | —HN—(phenylene with $SO_3H$ and $CH_3$)—NH— |
| 5 | —$CH_3$ | —HN—(phenylene with $SO_3H$)—NH— |
| 6 | —H | —HN—(phenylene with $SO_3H$ and $CH_3$)—NH— |
| 7 | —H | —HN—(phenylene with $HO_3S$ and $SO_3H$)—NH— |

-continued

| Example No. | R₁ | Bridge X |
|---|---|---|
| 8 | —H | 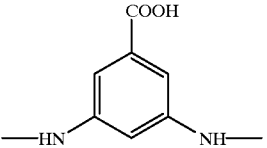 3,5-diaminobenzoic acid bridge (COOH, —HN—, —NH—) |
| 9 | —CH₃ | 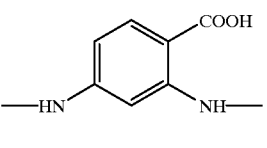 2,4-diamino-benzoic acid bridge (COOH) |
| 10 | —H | 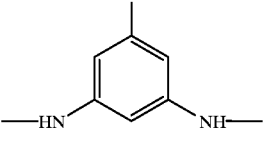 3,5-diamino-anisole bridge (OMe) |
| 11 | —CH₃ | 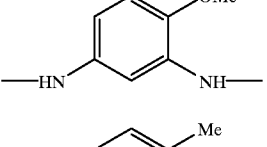 2,4-diamino-anisole bridge (OMe) |
| 12 | —H | 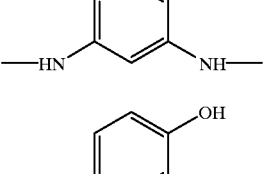 2,4-diamino-toluene bridge (Me) |
| 13 | —H | 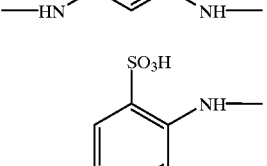 2,4-diamino-phenol bridge (OH) |
| 14 | —CH₃ | 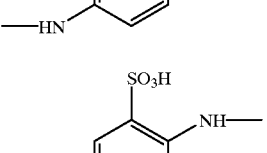 2,4-diamino-benzenesulfonic acid bridge (SO₃H) |
| 12 | —CH₃ | 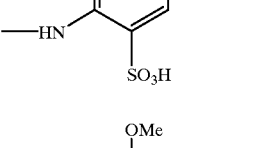 2,5-diamino-1,4-benzenedisulfonic acid bridge (SO₃H, SO₃H) |
| 16 | —H | 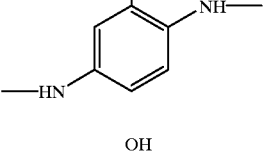 diamino-methoxyphenyl bridge (OMe) |
| 17 | —H | 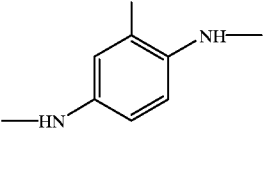 diamino-hydroxyphenyl bridge (OH) |

-continued

| Example No. | R₁ | Bridge X |
|---|---|---|
| 18 | —H | 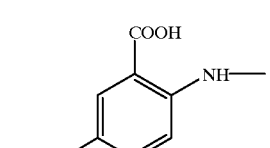 2-amino-5-amino-benzoic acid bridge (COOH) |
| 19 | —CH₃ | 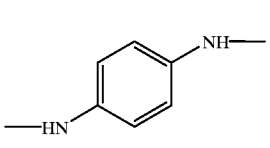 1,4-diamino-benzene bridge |
| 20 | —H | 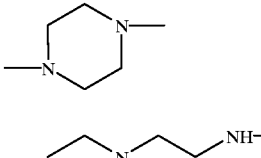 piperazine bridge |
| 21 | —H | 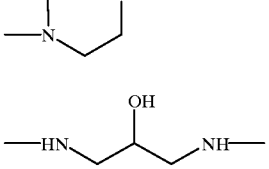 piperazinyl-ethylamino bridge |
| 22 | —CH₃ | 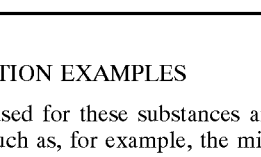 1,3-diamino-2-hydroxypropane bridge (OH) |

APPLICATION EXAMPLES

The dyeing methods used for these substances are generally known methods, such as, for example, the migration process, exhaust process, all-in process and jigger process, and these dyestuffs are also suitable for dyeing "fully fashioned" articles.

Application Example A

A dyebath comprising 1000 parts of demineralized water, 80 parts of Glauber salt (calcined), 1 part of sodium 1-nitrobenzene-3-sulfonate and 1 part of dyestuff from Example 1 is heated to 80° C. in the course of 10 minutes. 100 parts of mercerized cotton are then added. Dyeing is carried out at 80° C. for 5 minutes and the bath is then heated to 95° C. in the course of 15 minutes. After 10 minutes at 95° C., 3 parts of soda are added, after 20 minutes a further 7 parts of soda are added, and after 30 minutes at 95° C. another 10 parts of soda are added. Dyeing is then continued at 95° C. for 60 minutes. The dyed material is then removed from the dyebath and rinsed for 2 minutes in running demineralized water of 60° C.±10° C. and 1 minute in running tap water of 60° C.±10° C. It is now washed twice for 10 minutes in 5000 parts of boiling demineralized water each time, and is then rinsed for a further 2 minutes in running demineralized water of 60° C.±10° C., 1 minute in running tap water of 60° C.±10° C. and 1 minute in cold tap water. After drying, a brilliantly orange dyeing on cotton with good fastness properties is obtained.

Application Example B

A dyebath comprising 1000 parts of demineralized water; 80 parts of Glauber salt (calcined), 3 parts of soda, 1 part of sodium 1-nitrobenzene-3-sulfonate, 1 part of dyestuff from Example 1 and 100 parts of mercerized cotton is heated to 90–95° C. in the course of 45–60 minutes and a further 7 parts of soda are added. Dyeing is carried out at 90–95° C. for 45–60 minutes. The dyed material is then removed from the dyebath and rinsed for 2 minutes in running demineralized water of 60° C.±10° C. and 1 minute in running tap water of 60° C.±10° C. It is now washed twice for 10 minutes in 5000 parts of boiling demineralized water each time and is then rinsed for a further 2 minutes in running demineralized water of 60° C.±10° C., 1 minute in running tap water of 60° C.±10° C. and 1 minute in cold tap water. After drying, a brilliantly orange dyeing on cotton with good fastness properties is obtained.

The dyestuffs of Examples 2 to 22 or dyestuff mixtures of Examples 1 to 22 can also be used in a manner analogous to that described in Application Examples A and B for dyeing cotton. Brilliant orange dyeings which have good fastness properties are obtained.

Application Example C

A printing paste with the constituents

| | |
|---|---|
| 40 | parts of the dyestuff from Example 1 |
| 100 | parts of urea |
| 330 | parts of water |
| 500 | parts of a 4% strength sodium alginate thickener |
| 10 | parts of sodium 1-nitrobenzene-3-sulfonate |
| 20 | parts of soda |
| 1000 | parts total | is applied to cotton material by customary printing processes.

The printed and dried material is steamed at 102–105° C. for 4–8 minutes and then rinsed cold and hot. The fixed cotton material is subsequently washed at the boil (analogously to Application Example A) and dried. Brilliant orange dyeings which have good fastness properties are obtained.

The dyestuffs of Examples 2 to 22 or dyestuff mixtures of Examples 1 to 22 can also be used in a manner analogous to that described in Application Examples C for printing cotton. Brilliant orange printings which have good fastness properties are obtained.

Application Example D 2.5 parts of the dyestuff obtained in Example 38 are dissolved with stirring at 25° C. in a mixture of 20 parts diethyleneglycol and 77.5 parts water to obtain a printing ink suitable for ink jet printing.

The dyestuffs of examples 2 to 22 or dyestuff mixtures of examples 1 to 22 can also be used in a manner analogous to that described in application examples D.

What is claimed is:
1. Compounds of the general formula (I)

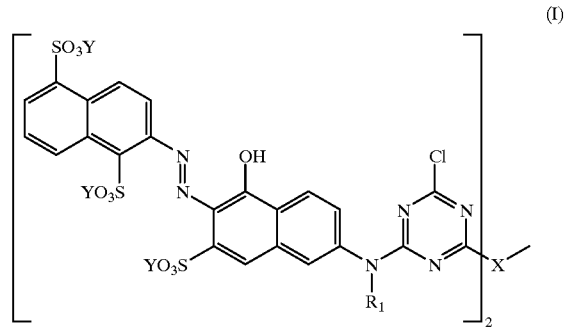

wherein $R_1$ represents hydrogen or a $C_{1-4}$-alkyl group;
X represents:
   (a) the radical of a cyclic diamine other than an aromatic diamine, which can optionally be substituted;
   (b) the radical of an aromatic diamine, wherein said radical is a member selected from the group consisting of

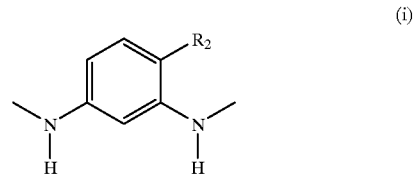

wherein $R_2$ is a member selected from the group consisting of —H, and —OH, provided that when $R_2$ is H, $R_1$ is H; and

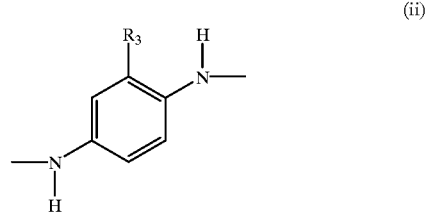

wherein $R_3$ is —OH;
or
   (c) the radical of an aliphatic group, said radical represented by the formula

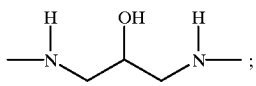

and
Y represents hydrogen or an alkali metal, and mixtures of such compounds.
2. Cotton which has been dyed with a compound of the formula (I) according to claim 1 and salts or mixtures thereof.
3. A printing ink composition comprising one or more dye compound of formula (I) according to claim 1.

4. A process for the synthesis of compounds of the general formula I according to claim 1, comprising reacting two moles of a compound of the formula (II)

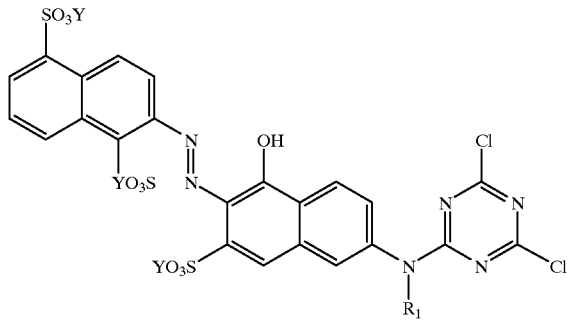
(II)

wherein $R_1$ represents hydrogen or a $C_{1-4}$-alkyl group and Y represents hydrogen or an alkali metal, with (a) one mole of a cyclic diamine other than an aromatic diamine, which is optionally substituted, (b) an aromatic diamine selected from the group consisting of

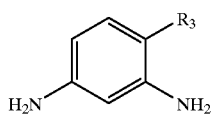

wherein $R_2$ is a member selected from the group consisting of —H and —OH, provided that when $R_2$ is H, $R_1$ in formula (II) is H; and

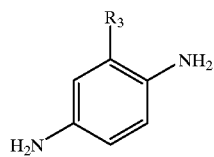
(ii)

wherein $R_3$ is —OH;
or (c) an aliphatic diamine, said diamine represented by the formula

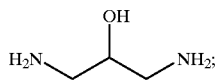

and mixtures of such compounds.

5. A process for dyeing an organic substrate, comprising contacting said organic substrate with the compounds of formula (I) of claim 1 or mixtures thereof.

6. The process of claim 5, wherein said organic substrate is at least one member selected from the group consisting of cellulose, polyamides and animal fibers.

7. The process of claim 6 wherein said organic substrate is cotton.

8. A substrate dyed with compounds of the formula (I) according to claim 1 or mixtures thereof.

9. The compounds of claim 1, wherein the $C_{1-4}$-alkyl group is a methyl group.

10. Compounds of the general formula

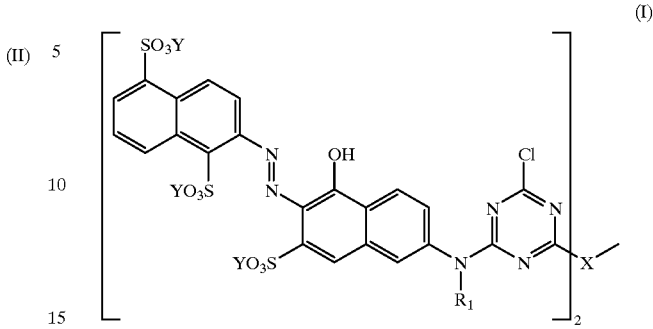
(I)

wherein Y represents hydrogen or an alkali metal, and mixtures of such compounds, and wherein $R_1$ and X are defined below:

| $R_1$ | Bridge X |
|---|---|
| H | |
| —H | |
| —H | |
| —CH$_3$ | |
| —H | |
| —H | |
| —CH$_3$ | |

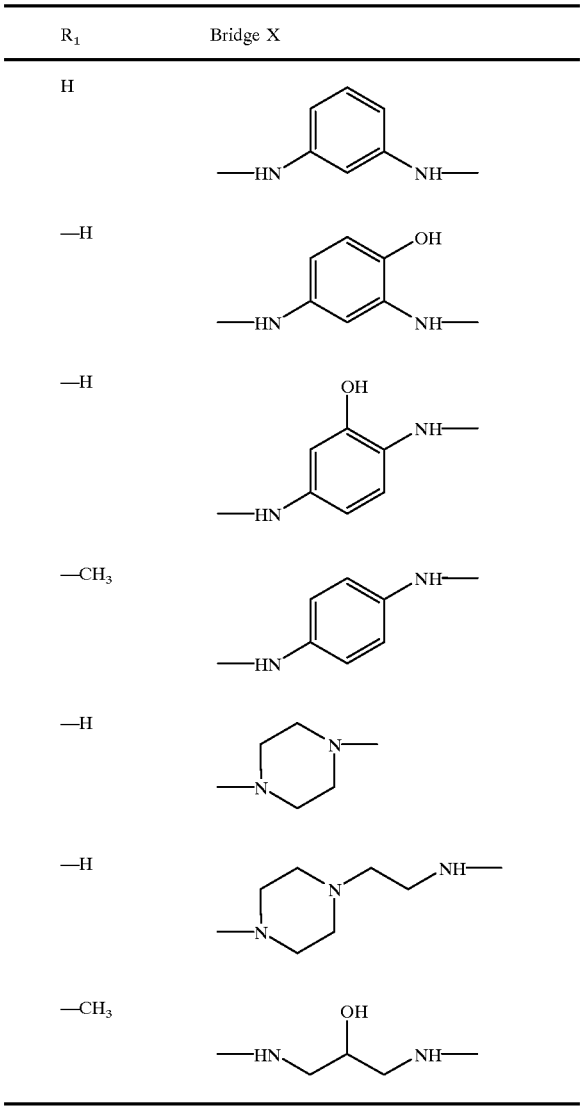

11. Compounds of the general formula (I)

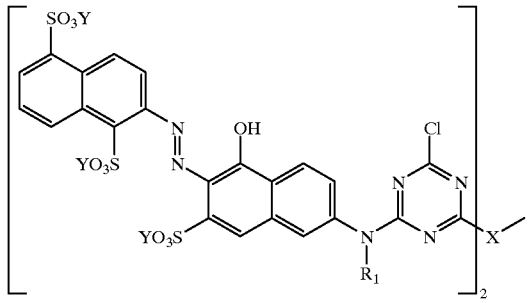

wherein $R_1$ represents hydrogen or a $C_{1-4}$-alkyl group; X represents the radical of a cyclic diamine other than an aromatic diamine; and Y represents hydrogen or an alkali metal, and mixtures of such compounds.

12. Compounds of the general formula (I)

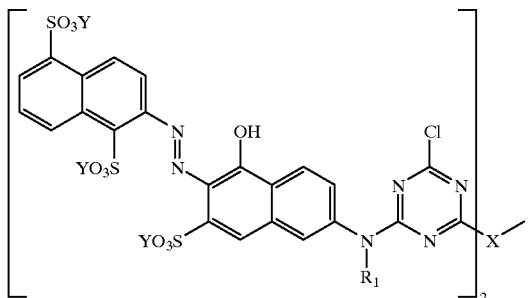

wherein $R_1$ represents hydrogen or a $C_{1-4}$-alkyl group; X represents the radical of a cyclic diamine other than an aromatic diamine; and Y represents hydrogen or an alkali metal, and mixtures of such compounds; wherein the radical of the cyclic diamine is a member selected from the group consisting of

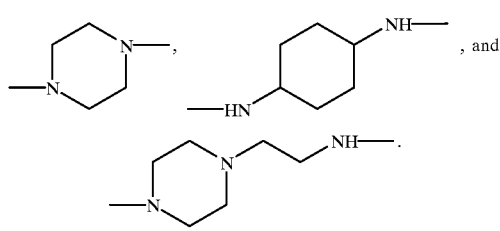

13. Compounds of the general formula (I)

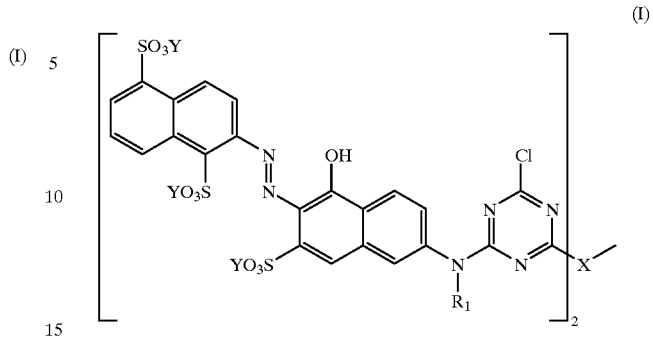

wherein $R_1$ represents hydrogen or a $C_{1-4}$-alkyl group; X represents the radical of an aliphatic group, said radical represented by the formula

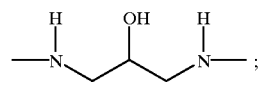

and Y represents hydrogen or an alkali metal, and mixtures of such compounds.

14. Compounds of the general formula (I)

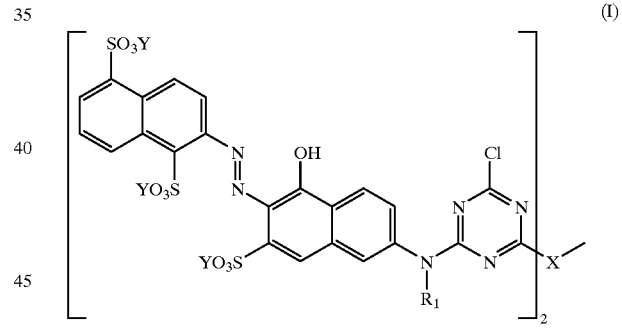

wherein $R_1$ represents hydrogen or a $C_{1-4}$-alkyl group; X represents the radical of an aromatic diamine, wherein said radical is a member selected from the group consisting of (i)

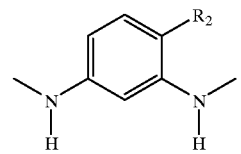

wherein $R_2$ is a member selected from the group consisting of —H, and —OH, provided that when $R_2$ is H, $R_1$ is H; and

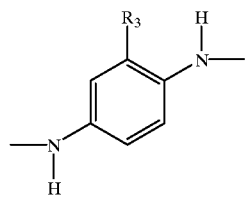 (ii)

wherein $R_3$ is —OH;

and Y represents hydrogen or an alkali metal, and mixtures of such compounds.

15. The compounds of the general formula (I) of claim 14, wherein $R_1$ and X are further defined below:

| $R_1$ | Bridge X |
|---|---|
| H | 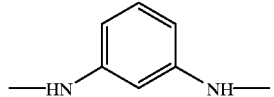 |
| —H | 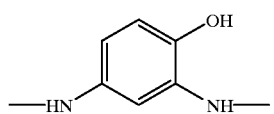 |
| —H | 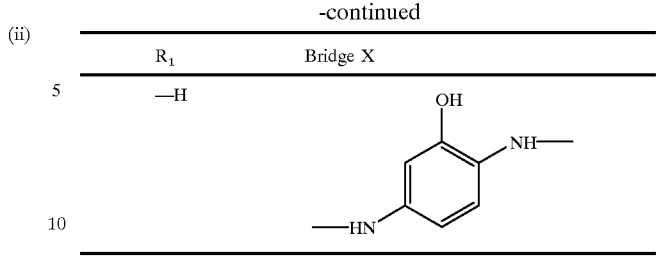 |

16. Compounds of the general formula (I)

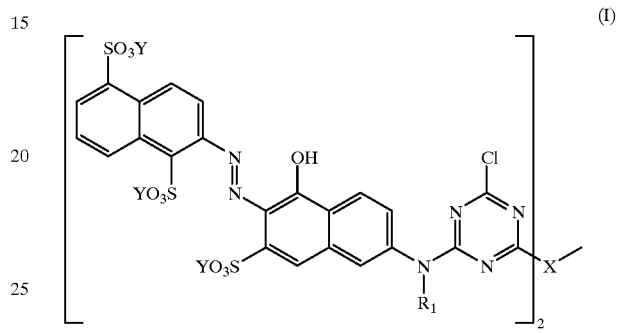 (I)

wherein $R_1$ represents hydrogen; X represents the radical of an aromatic diamine represented by the formula

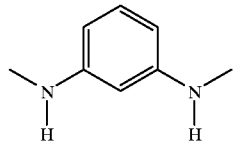

and Y represents hydrogen or an alkali metal, and mixtures of such compounds.

* * * * *